US011479150B2

(12) United States Patent
Sprenger

(10) Patent No.: US 11,479,150 B2
(45) Date of Patent: Oct. 25, 2022

(54) LONGITUDINAL ADJUSTER FOR A VEHICLE SEAT, AND VEHICLE SEAT

(71) Applicant: Adient Engineering and IP GmbH, Burscheid (DE)

(72) Inventor: Erik Sprenger, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/298,987

(22) PCT Filed: Dec. 2, 2019

(86) PCT No.: PCT/EP2019/083257
§ 371 (c)(1),
(2) Date: Jun. 2, 2021

(87) PCT Pub. No.: WO2020/114946
PCT Pub. Date: Jun. 11, 2020

(65) Prior Publication Data
US 2022/0048409 A1 Feb. 17, 2022

(30) Foreign Application Priority Data

Dec. 7, 2018 (DE) .................... 10 2018 131 445.0
Feb. 12, 2019 (DE) .................... 10 2019 103 476.0

(51) Int. Cl.
*B60N 2/06* (2006.01)
*B60N 2/02* (2006.01)

(52) U.S. Cl.
CPC ............ *B60N 2/067* (2013.01); *B60N 2/0232* (2013.01); *B60N 2002/0236* (2013.01)

(58) Field of Classification Search
CPC ................. B60N 2/067; B60N 2/0232; B60N 2002/0236; B60N 2/42736; B60N 2/0732; B60N 2/42709; B60N 2/4214
(Continued)

(56) References Cited

U.S. PATENT DOCUMENTS 3,374,347 A * 3/1968 Hirose .................... F21V 21/26
403/111
4,150,872 A * 4/1979 Sugiyama .............. G02B 13/04
359/749
(Continued)

FOREIGN PATENT DOCUMENTS

DE 19617877 C1 6/1997
DE 29814626 U1 2/1999
(Continued)

OTHER PUBLICATIONS

European Patent Office, International Search Report and Written Opinion in Application No. PCT/EP2019/083257, dated Feb. 12, 2020, 16 pages. Rijswijk Netherlands.
(Continued)

*Primary Examiner* — Mark R Wendell
(74) *Attorney, Agent, or Firm* — Marshall & Melhorn, LLC

(57) ABSTRACT

A longitudinal adjuster for a motor vehicle seat may have a seat rail that can be connected to the vehicle seat, and a floor rail, which can be connected to a vehicle floor and on which the seat rail is displaceably guided. The longitudinal adjuster may have a drive device for adjusting the seat rail relative to the floor rail along the longitudinal direction. The drive device may have a spindle fixed to the floor rail or to the seat rail. A rotatable spindle nut may be mounted on the spindle via a thread engagement. An electric motor may be operatively connected to the spindle nut for driving the spindle nut. A drive-side output shaft of the electric motor may be oriented parallel to the spindle. The floor rail has a cut-out and the electric motor is at least partly arranged through the cut-out.

15 Claims, 4 Drawing Sheets

(58) Field of Classification Search
USPC .................................................. 297/344.1
See application file for complete search history.

(56) References Cited

U.S. PATENT DOCUMENTS

| | | | | | |
|---|---|---|---|---|---|
| 4,703,972 | A | * | 11/1987 | Omberg | B60J 3/0204 248/231.81 |
| 4,721,337 | A | * | 1/1988 | Tomita | B60N 2/067 248/393 |
| 4,915,340 | A | * | 4/1990 | Nawa | B60N 2/0224 248/419 |
| 5,170,975 | A | * | 12/1992 | Chadwick | F16M 11/10 248/284.1 |
| 5,273,242 | A | | 12/1993 | Mouri et al. | |
| 5,516,071 | A | * | 5/1996 | Miyauchi | B60N 2/0705 248/429 |
| 5,603,552 | A | * | 2/1997 | Hanna | B60N 2/0232 248/429 |
| 5,865,506 | A | * | 2/1999 | Sakamoto | B60N 2/233 297/362.14 |
| 6,138,974 | A | * | 10/2000 | Okada | B60N 2/0232 248/429 |
| 6,206,333 | B1 | * | 3/2001 | Ochiai | B60N 2/0232 248/419 |
| 6,260,922 | B1 | * | 7/2001 | Frohnhaus | B60N 2/067 248/424 |
| 6,290,373 | B1 | * | 9/2001 | Dwight | F21V 19/02 362/285 |
| 6,305,658 | B1 | * | 10/2001 | Kita | B60N 2/067 248/421 |
| 6,499,712 | B1 | * | 12/2002 | Clark | B60N 2/0232 248/424 |
| 6,533,235 | B1 | * | 3/2003 | Dymerski | B60N 2/0232 248/421 |
| 6,820,851 | B2 | * | 11/2004 | Mochizuki | B60N 2/067 248/429 |
| 7,048,244 | B2 | * | 5/2006 | Hauck | B60N 2/0232 248/430 |
| 7,051,986 | B1 | * | 5/2006 | Taubmann | E05F 15/689 248/429 |
| 7,340,974 | B2 | * | 3/2008 | Landskron | B60N 2/067 74/425 |
| 8,328,155 | B2 | * | 12/2012 | Kostin | B60N 2/0232 248/429 |
| 8,733,725 | B2 | * | 5/2014 | Kimura | B60N 2/067 248/429 |
| 9,499,073 | B2 | * | 11/2016 | Tsuji | B60N 2/067 |
| 9,586,500 | B2 | | 3/2017 | Shimizu | B60N 2/06 |
| 9,987,951 | B2 | * | 6/2018 | Bonk | B60N 2/0843 |
| 2020/0189427 | A1 | * | 6/2020 | Huf | B60N 2/067 |

FOREIGN PATENT DOCUMENTS

| | | | |
|---|---|---|---|
| DE | 10056443 | A1 | 5/2002 |
| DE | 10062217 | A1 | 7/2002 |
| DE | 19860910 | B4 | 7/2007 |
| DE | 102006049807 | * | 4/2008 |
| DE | 102009033494 | A1 | 1/2011 |
| DE | 102016224512 | A1 | 6/2018 |
| DE | 102016224514 | A1 | 6/2018 |
| DE | 102017101996 | A1 | 8/2018 |
| JP | S6338048 | A | 2/1988 |
| JP | 2014189056 | A | 10/2014 |
| JP | 2016049799 | A | 4/2016 |
| WO | 2016150791 | A1 | 9/2016 |

OTHER PUBLICATIONS

German Patent Office, Office Action in Application No. DE102019103476.0, dated May 22, 2019, Munich Germany.
German Patent Office, Office Action in Application No. DE102019103476.0, dated May 6, 2021, Munich Germany.
Japanese Patent Office, Office Action in Application No. JP 2021-531583, dated Sep. 9, 2022, 9 pages.

* cited by examiner

Fig. 4
Fig. 5
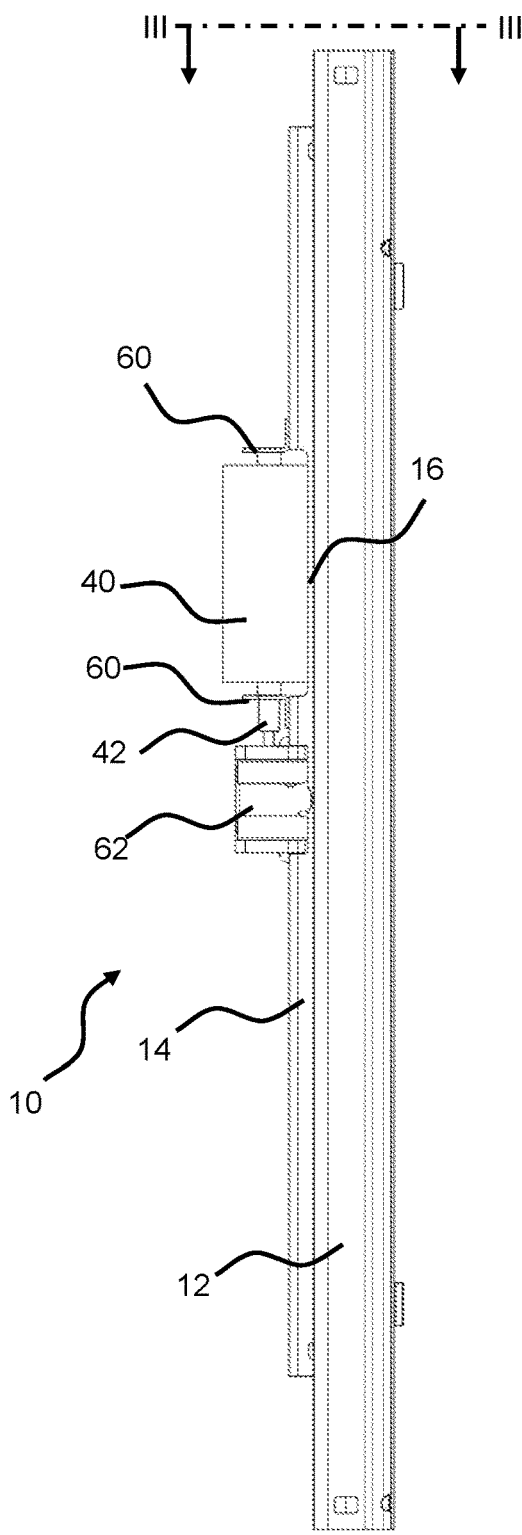
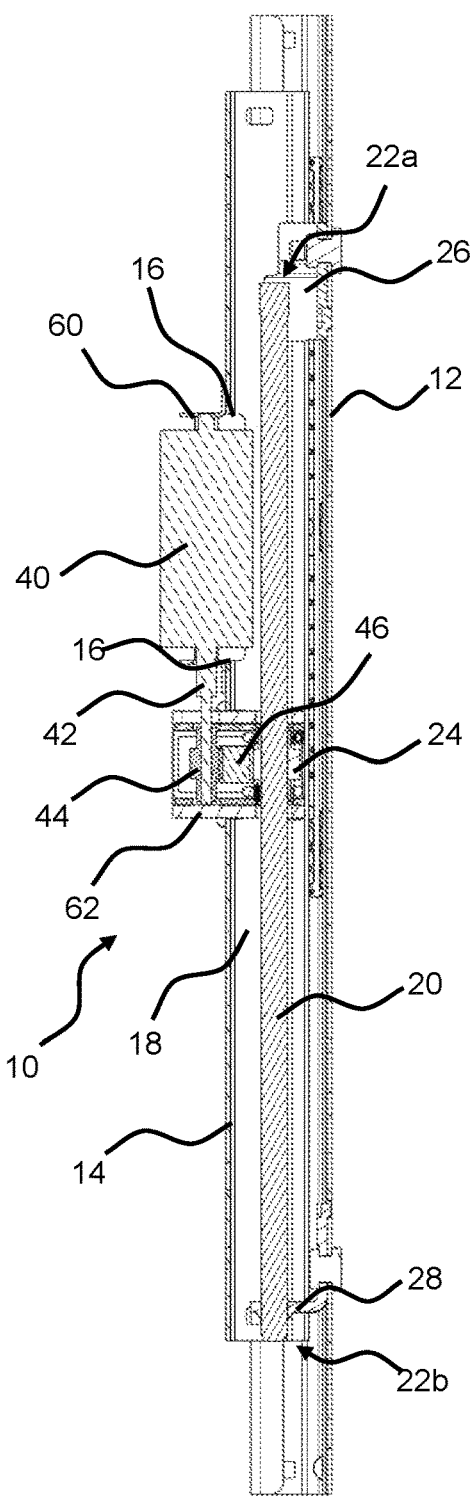

LONGITUDINAL ADJUSTER FOR A VEHICLE SEAT, AND VEHICLE SEAT

The invention relates to a longitudinal adjuster for a vehicle seat, in particular a motor vehicle seat, having at least one pair of rails, which has a seat rail which is connectable to the vehicle seat and a floor rail which is connectable to a vehicle floor and on which the seat rail is guided displaceably along a longitudinal direction, wherein the longitudinal adjuster has a drive device for adjusting the seat rail along the longitudinal direction relative to the floor rail, wherein the drive device has a spindle which is fixed with respect to the floor rail or with respect to the seat rail, a rotatable spindle nut which is mounted on the spindle via a threaded engagement, and an electric motor which is operatively connected to the spindle nut for driving of the spindle nut, wherein an output-side output shaft of the electric motor is oriented parallel to the spindle. The invention also relates to a vehicle seat.

Background

Exemplary longitudinal adjustment devices for vehicle seats are known from DE 10 2017 101 996 A1 and DE 298 14 626 U1. In the case of said longitudinal adjustment devices, a drive torque of a common motor is fed to two drive devices via a shaft running transversely with respect to the two pairs of rails. In this case, the motor is typically located between the two pairs of rails. The shaft is located in a region below the center of the vehicle seat, said shaft running transversely with respect to the two pairs of rails. The shaft is in this case assigned to the two seat rails, such that the shaft and the motor do not change their positions relative to the seat frame, but do change their positions relative to the floor rails. Such a longitudinal adjustment device for vehicle seats is also known from U.S. Pat. No. 5,273,242 A.

Such a construction requires a sufficient amount of installation space under the seat part. This installation space may be required for future further developments of the vehicle seat or of the vehicle itself. For example, it may be necessary in future in electrically operated motor vehicles that this installation space is required for accommodating batteries and/or accumulators.

In the prior art, DE 198 60 910 B4 discloses a drive for a longitudinal adjuster of a vehicle seat, in the case of which the longitudinal adjuster has two pairs of rails, each with a drive motor, the two drive motors each being arranged so as to protrude into an intermediate space between the corresponding pair of rails.

A vehicle seat arrangement is known from DE 10 2016 224 512 A1, comprising a seat frame and at least one pair of rails, which has a seat rail which is connected to the seat frame and a floor rail which is to be connected to a vehicle floor and on which the seat rail is guided displaceably along a longitudinal direction. A drive device is used to adjust the seat rail along the longitudinal direction relative to the floor rail and has a spindle, a rotatable spindle nut which is mounted on the spindle via a thread engagement, a gear unit which is operatively connected to the spindle nut, and an electric motor for driving the spindle nut via the gear unit. In this case, provision is made for the spindle to be arranged on the seat rail and for the spindle nut and the gear unit to be arranged on the floor rail. Here, the drive motor is arranged completely below the floor rail and is able to be received in a cutout which is to be provided in a vehicle floor.

A longitudinal adjuster is known from DE 10 2016 224 514 A1, having a drive motor which is mounted coaxially on a spindle and which is arranged completely in a cavity which is formed between a seat rail and a floor rail.

A longitudinal adjuster is known from DE 100 56 443 A1, the drive motor of which is arranged in a region in front of a seat rail so as to be in alignment with a spindle mounted in the seat rail.

Summary

The problem addressed by the invention is that of improving a longitudinal adjuster of the type mentioned at the outset, in particular facilitating a longitudinal adjuster with an unobstructed intermediate space between a first and a second pair of rails, and also of providing a corresponding vehicle seat.

This problem is solved according to the invention by means of a longitudinal adjuster for a vehicle seat, in particular a motor vehicle seat, having at least one pair of rails, which has a seat rail which is connectable to the vehicle seat and a floor rail which is connectable to a vehicle floor and on which the seat rail is guided displaceably along a longitudinal direction, wherein the longitudinal adjuster has a drive device for adjusting the seat rail along the longitudinal direction relative to the floor rail, wherein the drive device has a spindle which is fixed with respect to the floor rail or with respect to the seat rail, a rotatable spindle nut which is mounted on the spindle via a threaded engagement, and an electric motor which is operatively connected to the spindle nut for driving of the spindle nut, wherein an output-side output shaft of the electric motor is oriented parallel to the spindle, wherein the seat rail or the floor rail has a cutout and the electric motor is arranged through the cutout at least partially in a cavity which is formed between the seat rail and the floor rail.

As a result of the fact that the seat rail or the floor rail has a cutout and the electric motor is arranged through the cutout at least partially in a cavity which is formed between the seat rail and the floor rail, the electric motor can be positioned through the cutout partially in the cavity in such a way that the lowest possible overall height, measured from a lower edge of the floor rail opposite the electric motor and an upper edge of the electric motor and/or of a gear housing or an upper edge of the seat rail opposite the electric motor and a lower edge of the electric motor and/or of a gear housing, is achievable.

The subclaims relate to advantageous embodiments, which may be used individually or in combination with one another.

The electric motor can be arranged in the cavity, while maintaining a distance from the spindle. The distance can be in the range from 0.1 to 10 mm. The distance is preferably in the range from 0.2 to 5 mm.

An output-side output shaft of the electric motor can be oriented parallel to the longitudinal direction. A longitudinal extent of the electric motor can be oriented parallel to the longitudinal direction. A longitudinal extent of the electric motor can in particular be oriented parallel to the spindle.

The electric motor can drive the spindle nut by means of a toothed wheel. Here, a toothed wheel which is arranged on the output shaft can be in toothed engagement with an external toothing of the spindle nut. Corresponding transmission ratios or reduction ratios can be implemented by way of appropriate dimensioning of the toothed wheel and of the spindle nut.

The electric motor can drive the spindle nut by means of a toothed belt. Here, a toothed wheel which is arranged on the output shaft can be connected to an external toothing of the spindle nut via a toothed belt. An optimal toothed engagement is achievable by means of a helical toothing arrangement, whereby the efficiency, the noise behavior and the service life of the drive are advantageously increased. With a corresponding configuration of the toothed wheel, cheaper materials can also be used, which also reduces production costs.

The spindle can be held at at least one of two of its opposite ends by means of a first spindle holder. The spindle can be held at a first end by means of a first spindle holder. The spindle can be held at a second end by means of a second spindle holder. The first spindle holder and the second spindle holder can be designed differently.

The first spindle holder can hold the spindle laterally in a form-fitting manner. The first spindle holder can be designed in such a way that it does not protrude beyond the spindle in a vertical direction. The first spindle holder can be arranged at the first end of the spindle, said first end being situated in the direction of the electric motor as viewed from the spindle nut. One possible embodiment of the first spindle holder is described, for example, in WO 2016/150 791 A1, the disclosure of which in this regard is expressly incorporated.

The longitudinal adjuster can have two pairs of rails, each of which is assigned a separate drive device. Each pair of rails thus has a dedicated drive device, and therefore the pairs of rails are drivable by means of (spatially) separate drive devices. A control device can be provided in order to control the drive devices, and therefore a synchronous adjustment movement can be carried out on the pairs of rails. A corresponding activation of the drive devices by means of the control device also makes it possible to carry out an asynchronous adjustment movement on the pairs of rails. An asynchronous adjustment movement of the pairs of rails can be used, for example, to pivot or rotate a vehicle seat that is mountable on the longitudinal adjuster. One possible adaptation of the longitudinal adjuster to a rotatable vehicle seat is described, for example, in DE 10 2009 033 494 A1, the disclosure of which in this regard is expressly incorporated.

The problem addressed is also solved according to the invention by means of a vehicle seat, in particular a motor vehicle seat, having a longitudinal adjuster described above.

DESCRIPTION OF THE FIGURES

Before embodiments of the invention are described in more detail below with reference to figures, it must firstly be stated that the invention is not limited to the components described. Furthermore, the terminology used also does not constitute a restriction, but rather is merely exemplary in nature. Where the singular is used below in the description and in the claims, this also encompasses the plural in each case, unless this is explicitly ruled out by the context.

The invention is explained in more detail below on the basis of advantageous exemplary embodiments illustrated in the figures. However, the invention is not restricted to these exemplary embodiments. In the figures:

FIG. 4 shows a side view of the pair of rails of FIG. 2, FIG. 5 shows a longitudinal section of the pair of rails of FIG. 2 along the section line V-V shown in FIG. 3.

DETAILED DESCRIPTION

Figure 1:
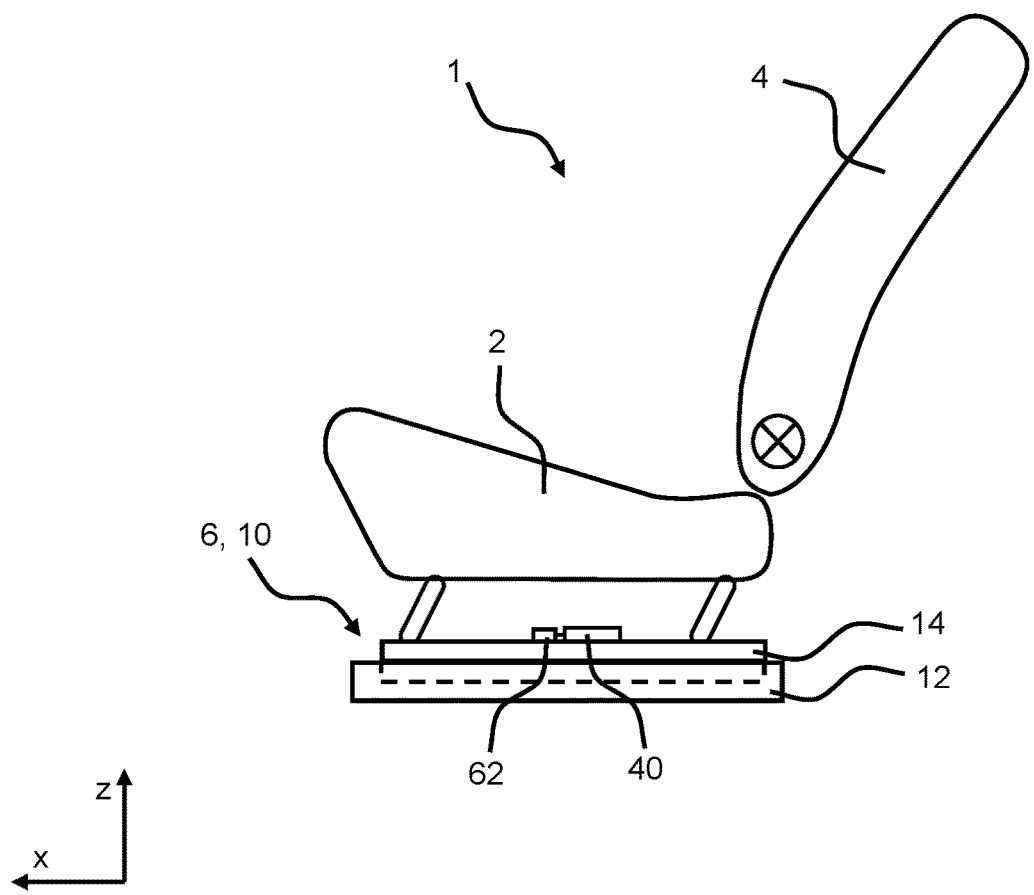
FIG. 1 schematically shows a vehicle seat according to the invention with a longitudinal adjuster according to a first exemplary embodiment.
Figure 2:
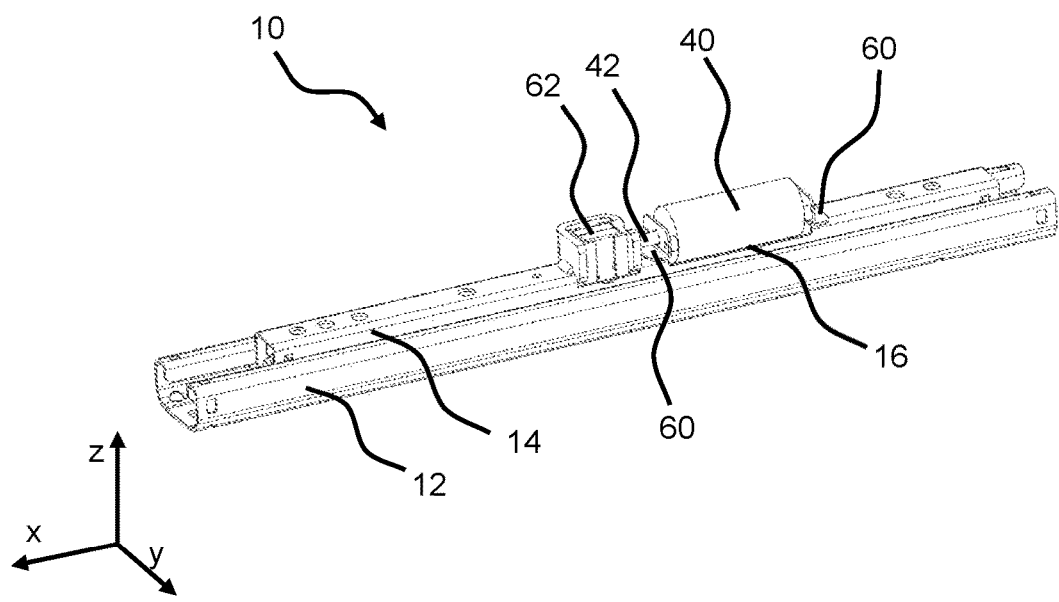
FIG. 2 shows a perspective illustration of a pair of rails of a longitudinal adjuster according to the first exemplary embodiment.
Figure 3:
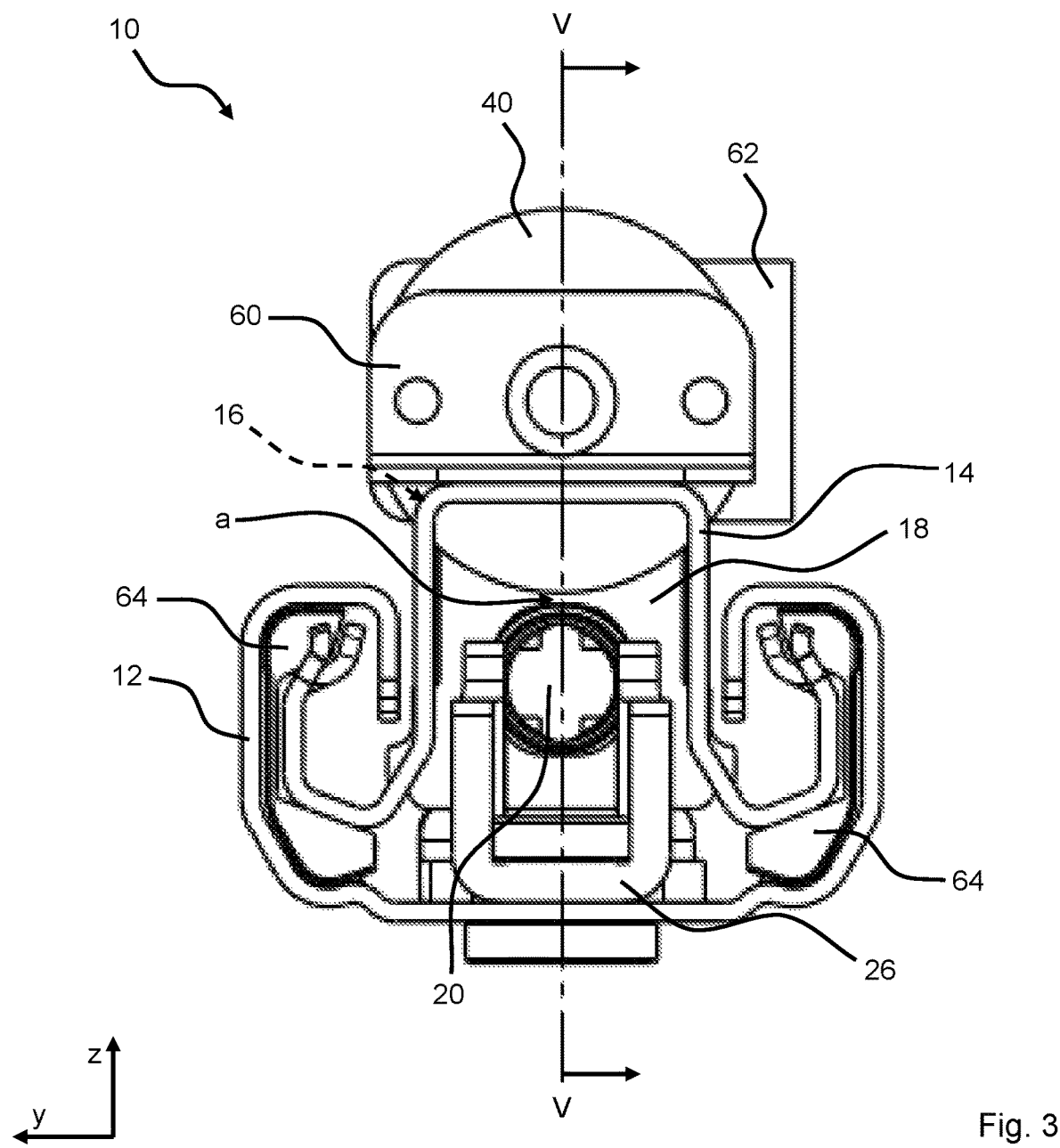
FIG. 3 shows a rear view of the pair of rails of FIG. 2.

A vehicle seat 1 which is schematically illustrated in FIG. 1 is described below using three spatial directions which run perpendicularly with respect to one another. In the case of a vehicle seat 1 installed in the vehicle, a longitudinal direction x runs largely horizontally and preferably parallel to a vehicle longitudinal direction which corresponds to the normal direction of travel of the vehicle. A transverse direction which runs perpendicularly with respect to the longitudinal direction x is also oriented horizontally in the vehicle and runs parallel to a vehicle transverse direction. A vertical direction z runs perpendicularly with respect to the longitudinal direction x and perpendicularly with respect to the transverse direction. In the case of a vehicle seat 1 installed in the vehicle, the vertical direction z runs parallel to the vehicle vertical axis.

The positional and directional indications used, such as for example front, rear, top and bottom, relate to a viewing direction of an occupant seated in the vehicle seat 1 in a normal seating position, wherein the vehicle seat 1 is installed in the vehicle, in a use position suitable for passenger transport, with an upright backrest 4, and is oriented in the conventional manner in the direction of travel. A vehicle seat 1 according to the invention may however also be installed in a different orientation, for example transversely with respect to the direction of travel.

The vehicle seat 1 has a seat part 2 and a backrest 4 which is adjustable in terms of its inclination relative to the seat part 2 and which can be pivoted forward in the direction of the seat part 2. For the longitudinally displaceable and longitudinally adjustable attachment of the vehicle seat 1 in the vehicle, the vehicle seat 1 has a longitudinal adjuster 6.

Figure 6:
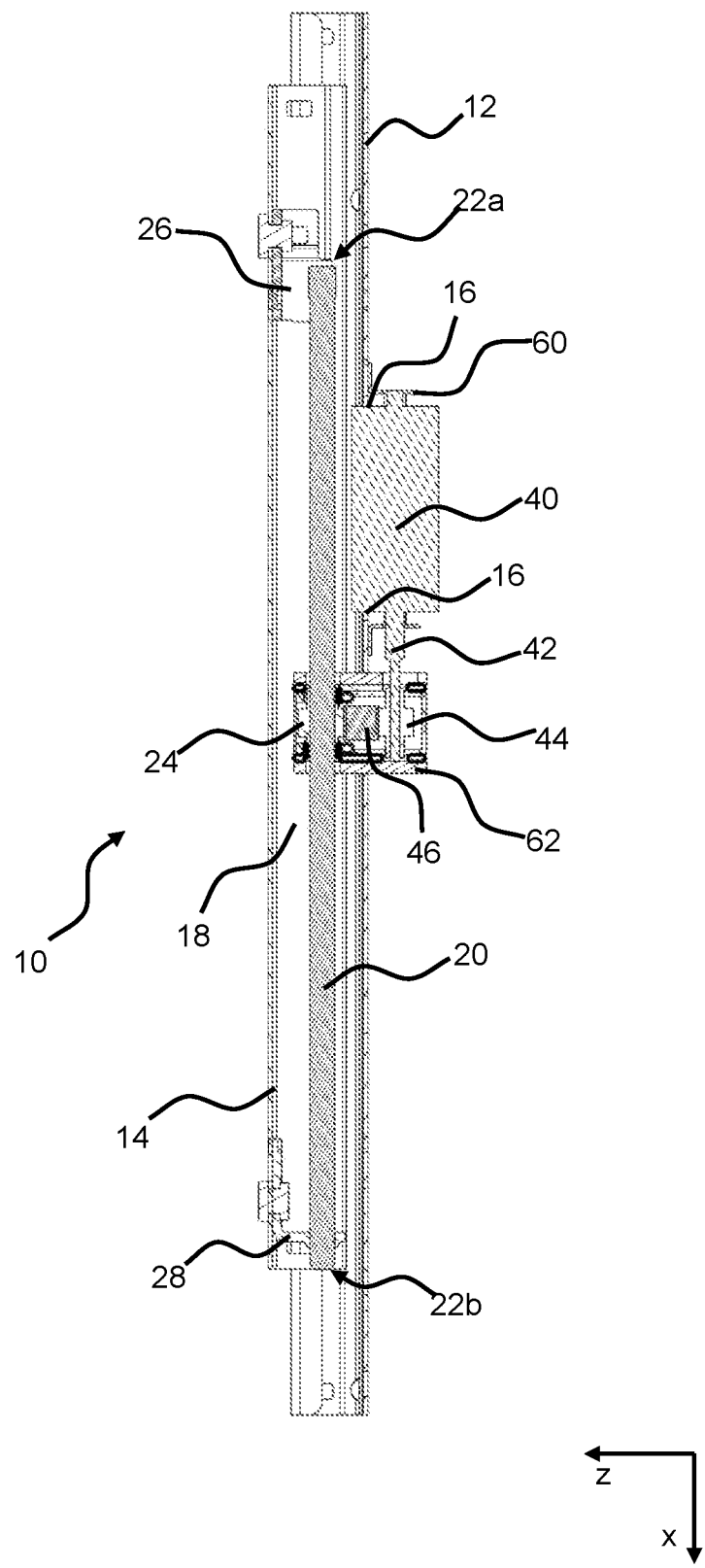
FIG. 6 shows a longitudinal section, corresponding to the illustration of FIG. 5, of a pair of rails of a longitudinal adjuster according to a second exemplary embodiment.

The longitudinal adjuster 6 is used for longitudinal adjustment, that is to say for the adjustment of a seat longitudinal position, of the vehicle seat 1. For this purpose, the longitudinal adjuster 6 has a respective pair of rails 10 on each side of the vehicle seat. One pair of rails 10 is arranged on a tunnel side and the other pair of rails 10 is arranged on a sill side. The two pairs of rails 10 of the longitudinal adjuster 6 run parallel to one another. Each pair of rails 10 has a floor rail 12 which is connectable to a vehicle floor and, guided by means of same, a seat rail 14 which is connectable to the vehicle seat 1. The seat rail 14 is guided displaceably along the longitudinal direction x relative to the floor rail 12. In the present case, a longitudinal adjuster 6 according to a first exemplary embodiment is illustrated. The vehicle seat 1 can alternatively be mounted on a longitudinal adjuster 6 according to a second exemplary embodiment, as shown in FIG. 6.

FIGS. 2 to 5 show different illustrations and views of a pair of rails 10 of the longitudinal adjuster 6 according to a first exemplary embodiment and are described jointly below.

The respective seat rail 14 and the respective floor rail 12 engage around each other in reciprocal fashion to form a rail profile and are movable relative to one another in the longitudinal direction x, a plurality of rolling bodies, in particular in the form of balls in a ball cage 64, being arranged between the seat rail 14 and the associated floor rail 12 in order to reduce friction.

In order to adjust the longitudinal adjuster 6, a drive device for adjusting the seat rail 14 along the longitudinal direction x relative to the floor rail 12 is provided. The drive device has a spindle 20 which is arranged in a cavity 18 formed between the seat rail 14 and the floor rail 12 and which is fixed relative to the floor rail 12. The spindle 20 is arranged in a stationary manner, for which purpose the spindle 20 is held at its opposite ends 22*a*, 22*b* by means of spindle holders 26, 28. The spindle holders 26, 28 are firmly connected to the floor rail 12 and in some cases also directly connected to the vehicle structure in a form-fitting manner. Here, the rear, first end 22*a* is held by means of the first spindle holder 26 and the front, second end 22*b* is held by means of the second spindle holder 28. The first spindle holder 26 holds the spindle 20 laterally in a form-fitting manner, wherein the first spindle holder 26 does not protrude beyond the spindle 20 in the vertical direction z. In the present case, the first spindle holder 26 is arranged at the rear, first end 22*a* of the spindle 20, said first end being situated in the direction of the electric motor 40 as viewed from the spindle nut 24.

The vehicle seat 1 can be longitudinally adjusted by an electric motor, for this purpose an electric motor 40 is provided on at least one of the two pairs of rails 10, preferably a respective electric motor 40 is provided on each of the two pairs of rails 10. Furthermore, the drive device has a rotatable spindle nut 24 which is mounted on the spindle 20 via a threaded engagement. The electric motor 40 is operatively connected to the spindle nut 24 for driving of same.

The seat rail 14 has a cutout 16 for receiving the electric motor 40. The electric motor 40 is at least partially introduced through the cutout 16 into the cavity 18 which is formed between the seat rail 14 and the floor rail 12. The electric motor 40 is held in the cutout 16 of the seat rail 14, while maintaining a distance a from the spindle 20. The cutout 16 is preferably arranged centrally in the seat rail 14, as viewed in the transverse direction y. The electric motor 40 is preferably arranged centrally above the seat rail 14, as viewed in the transverse direction y.

The electric motor 40 is fixed to the seat rail 14 by means of two motor holders 60. The electric motor 40 has an output-side output shaft 42 which is oriented parallel to the longitudinal direction x, in particular parallel to the spindle 20. A longitudinal extent of the electric motor 40 is also oriented parallel to the longitudinal direction x, in particular parallel to the spindle 20. The output shaft 42 is preferably arranged in the vertical direction z above the spindle 20. The output shaft 42 is preferably arranged centrally above the spindle 20, as viewed in the transverse direction y. The output shaft 42 protrudes axially at least into a gear housing 62. In the present case, the gear housing 62 is arranged in front of the electric motor 40, as viewed in the longitudinal direction x.

The spindle nut 24 can be drivable by the electric motor 40 directly by means of a toothed wheel 44 or indirectly by means of a toothed wheel 44 in conjunction with a toothed belt 46. The toothed wheel 44 is rotatably mounted in the gear housing 62, above the spindle nut 24 in the vertical direction z. The toothed wheel 44 is connected to the output shaft 42 of the electric motor 40 in a rotationally fixed manner. In the present case, the toothed wheel 44 and the spindle nut 24 are not in direct toothed engagement with one another. In the present case, a toothed belt 46 is provided for transmitting the rotational movement of the toothed wheel 44 to the spindle nut 24.

According to a non-illustrated modification of the longitudinal adjuster according to the invention, direct toothed engagement can be made possible by way of appropriate dimensioning of the toothed wheel 44 and of the spindle nut 24, whereby a corresponding transmission ratio or reduction ratio can also be implemented here.

The electric motor 40 is positioned as deep as possible in the cavity 18, such that the lowest possible overall height, measured from a lower edge of the floor rail 12 and an upper edge of the electric motor 40 and/or of a gear housing 62, is achieved.

FIG. 6 shows a longitudinal section, corresponding to the illustration of FIG. 5, of a pair of rails 10 of a longitudinal adjuster 6 according to a second exemplary embodiment. Unless explicitly described otherwise, the longitudinal adjuster 6 of the second exemplary embodiment corresponds to that of the first exemplary embodiment.

The respective seat rail 14 and the respective floor rail 12 engage around each other in reciprocal fashion to form a rail profile and are movable relative to one another in the longitudinal direction x, a plurality of rolling bodies, in particular in the form of balls in a ball cage 64, being arranged between the seat rail 14 and the associated floor rail 12 in order to reduce friction.

In order to adjust the longitudinal adjuster 6, a drive device for adjusting the seat rail 14 along the longitudinal direction x relative to the floor rail 12 is provided. The drive device has a spindle 20 which is arranged in a cavity 18 formed between the seat rail 14 and the floor rail 12 and which is fixed relative to the seat rail 14. The spindle 20 is arranged in a stationary manner, for which purpose the spindle 20 is held at its opposite ends 22*a*, 22*b* by means of spindle holders 26, 28. The spindle holders 26, 28 are firmly connected to the seat rail 14. Here, the rear, first end 22*a* is held by means of the first spindle holder 26 and the front, second end 22*b* is held by means of the second spindle holder 28. The first spindle holder 26 holds the spindle 20 laterally in a form-fitting manner, wherein the first spindle holder 26 does not protrude beyond the spindle 20 in the vertical direction z. In the present case, the first spindle holder 26 is arranged at the rear, first end 22*a* of the spindle 20, said first end being situated in the direction of the electric motor 40 as viewed from the spindle nut 24.

The drive device has an electric motor 40 on at least one of the two pairs of rails 10, preferably a respective electric motor 40 on each of the two pairs of rails 10. Furthermore, the drive device has a rotatable spindle nut 24 which is mounted on the spindle 20 via a threaded engagement. The electric motor 40 is operatively connected to the spindle nut 24 for driving of same.

The floor rail 12 has a cutout 16 for partially receiving the electric motor 40. The electric motor 40 is at least partially introduced through the cutout 16 into the cavity 18 which is formed between the seat rail 14 and the floor rail 12. The electric motor 40 is held in the cutout 16 of the floor rail 12, while maintaining a distance a from the spindle 20. The cutout 16 is preferably arranged centrally in the seat rail 14, as viewed in the transverse direction y. The electric motor 40 is preferably arranged centrally above the seat rail 14, as viewed in the transverse direction y.

The features disclosed in the above description, in the claims and in the drawings may be of significance both individually and in combination for the realization of the invention in its various embodiments.

Although the invention has been described in detail in the drawings and in the above illustration, the illustrations are to be understood as being illustrative and exemplary and non-restrictive. In particular, the selection of the proportions of the individual elements illustrated in the drawing is not to be interpreted as being necessary or restrictive. Furthermore, the invention is in particular not restricted to the exemplary embodiments discussed. Further variants of the invention and of the embodiment thereof emerge to a person skilled in the art from the preceding disclosure, from the figures and from the claims.

Expressions such as "comprise", "have", "contain", "encompass" and the like used in the claims do not rule out further elements or steps. The use of the indefinite article does not rule out a multiplicity. A single device may perform the functions of several of the units or devices mentioned in the claims.

LIST OF REFERENCE DESIGNATIONS

1 Vehicle seat
2 Seat part
4 Backrest
6 Longitudinal adjuster
10 Pair of rails
12 Floor rail
14 Seat rail
16 Cutout
18 Cavity
20 Spindle
22a First end
22b Second end
24 Spindle nut
26 Spindle holder
28 Spindle holder
40 Electric motor
42 Output shaft
44 Toothed wheel
46 Toothed belt
60 Motor holder
62 Gear housing
64 Ball cage
a Distance
x Longitudinal direction
y Transverse direction
z Vertical direction

The invention claimed is:

1. A longitudinal adjuster for a motor vehicle seat, comprising:
at least one pair of rails, which has a seat rail which is connectable to the vehicle seat, and a floor rail which is connectable to a vehicle floor and on which the seat rail is guided displaceably along a longitudinal direction,
wherein the longitudinal adjuster has a drive device for adjusting the seat rail along the longitudinal direction relative to the floor rail,
wherein the drive device has a spindle which is fixed with respect to the floor rail or with respect to the seat rail, a rotatable spindle nut which is mounted on the spindle via a threaded engagement, and an electric motor which is operatively connected to the spindle nut for driving of the spindle nut,
wherein an output-side output shaft of the electric motor is oriented parallel to the spindle,
wherein the seat rail or the floor rail has a cutout and the electric motor is arranged through the cutout at least partially in a cavity which is formed between the seat rail and the floor rail,
wherein the cutout is formed on an upper wall of the seat rail or on a bottom wall of the floor rail.

2. The longitudinal adjuster as claimed in claim 1, wherein the electric motor is arranged in the cavity, while maintaining a distance (a) from the spindle.

3. The longitudinal adjuster as claimed in claim 2, wherein the distance (a) is in the range from 0.1 to 10 mm.

4. The longitudinal adjuster as claimed in claim 3, wherein the distance (a) is in the range from 0.2 to 5 mm.

5. The longitudinal adjuster as claimed in claim 1, wherein a longitudinal extent of the electric motor is oriented parallel to the longitudinal direction.

6. The longitudinal adjuster as claimed in claim 1, wherein a longitudinal extent of the electric motor is oriented parallel to the spindle.

7. The longitudinal adjuster as claimed in claim 1, wherein the electric motor drives the spindle nut via a toothed wheel.

8. The longitudinal adjuster as claimed in claim 7, wherein the toothed wheel is arranged on the output shaft and is in toothed engagement with an external toothing of the spindle nut.

9. The longitudinal adjuster as claimed in claim 1, wherein the electric motor drives the spindle nut via a toothed belt.

10. The longitudinal adjuster as claimed in claim 9, wherein a toothed wheel which is arranged on the output shaft is connected to an external toothing of the spindle nut via the toothed belt.

11. The longitudinal adjuster as claimed in claim 10, wherein the toothed wheel and the external toothing of the spindle nut have a helical toothing arrangement.

12. The longitudinal adjuster as claimed in claim 1, wherein the spindle is held at at least one of two of its opposite ends via a first spindle holder.

13. The longitudinal adjuster as claimed in claim 12, wherein the first spindle holder is designed in such a way that it does not protrude beyond the spindle in a vertical direction.

14. The longitudinal adjuster as claimed in claim 13, wherein the first spindle holder is arranged at a first end of the spindle, said first end being situated in the direction of the electric motor as viewed from the spindle nut.

15. A motor vehicle seat, having a longitudinal adjuster as claimed in claim 1.

* * * * *